United States Patent
Thunberg et al.

[15] 3,699,214
[45] Oct. 17, 1972

[54] PROCESS FOR THE MANUFACTURE OF FERROCYANIDE COMPOUNDS

[72] Inventors: Jon C. Thunberg, Amherst; James E. Philbrook, Nashua, both of N.H.

[73] Assignee: W. R. Grace & Co., New York, N.Y.

[22] Filed: May 1, 1970

[21] Appl. No.: 33,646

[52] U.S. Cl..................................423/367, 423/648
[51] Int. Cl...........................C01c 3/12, C01b 1/07
[58] Field of Search........................23/75, 79, 211, 77

[56] References Cited

UNITED STATES PATENTS

| | | | |
|---|---|---|---|
| 2,431,601 | 11/1947 | Young | 23/77 |
| 2,353,781 | 7/1944 | Neumark | 23/77 |

*Primary Examiner*—Oscar R. Vertiz
*Assistant Examiner*—Hoke S. Miller
*Attorney*—Thomas B. Graham

[57] ABSTRACT

A process for the preparation of alkali metal ferrocyanides which comprises the controlled addition of hydrogen cyanide to a reaction zone containing an aqueous solution of alkali metal hydroxide carrying a suspension of finely divided metallic iron, allowing the reaction to proceed at elevated temperatures, separating the caustic solution from the iron, recovering alkali metal ferrocyanide therefrom, and returning mother liquor to the reactant zone for further reaction with hydrogen cyanide, alkali metal hydroxide, and iron, and, in a preferred version, conducting the process with a plurality of solutions which are returned to the reaction zone in sequence after recovery of the alkali ferrocyanide therefrom.

5 Claims, 1 Drawing Figure

PATENTED OCT 17 1972 3,699,214
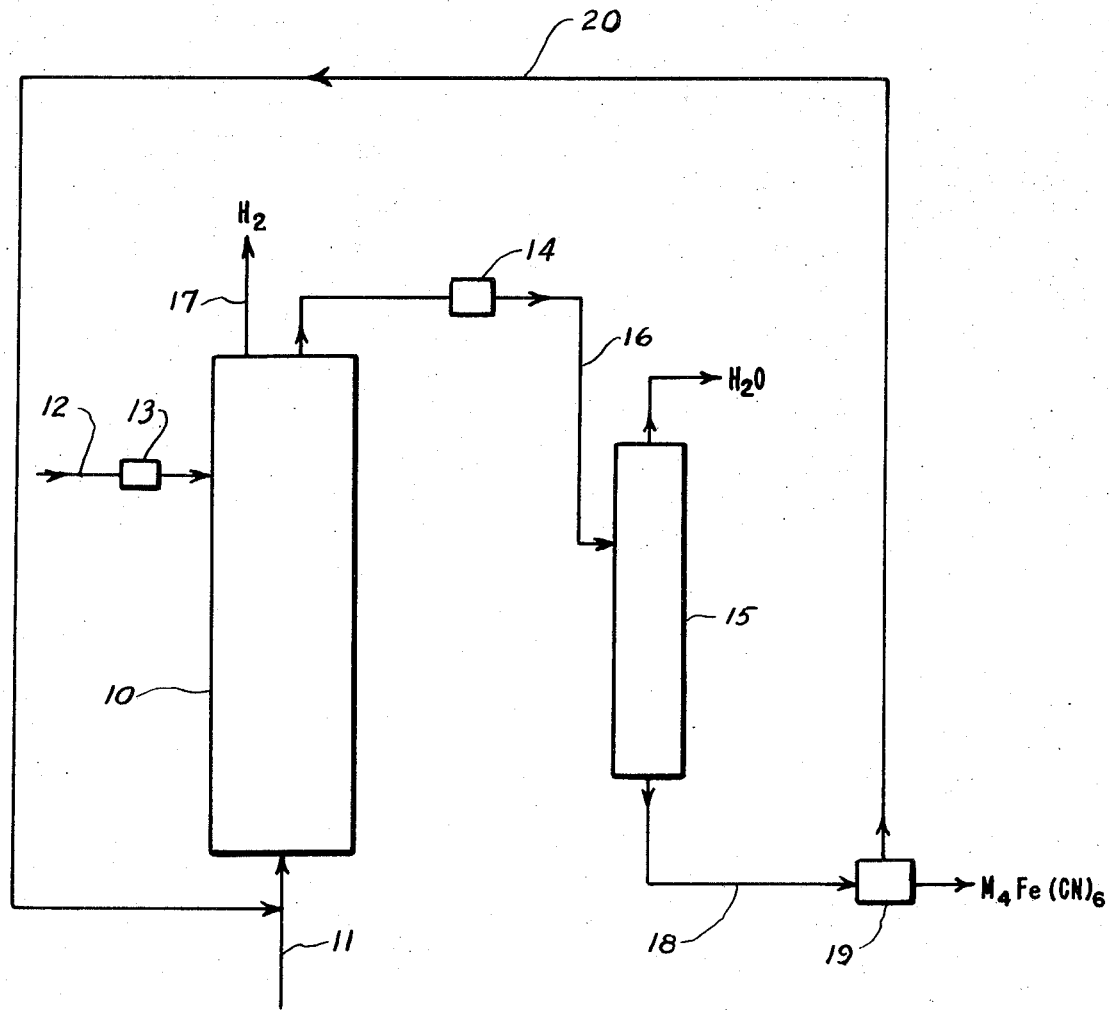
INVENTORS
JON C. THUNBERG
JAMES E. PHILBROOK
BY
Thomas F. Joham
ATTORNEY

PROCESS FOR THE MANUFACTURE OF FERROCYANIDE COMPOUNDS

BACKGROUND OF THE INVENTION

Alkali ferrocyanides have been commonly produced as incidental products obtained from the coal distillation gases occurring in and around plants manufacturing coal gas and coke oven gas.

Thus, the gas liquor obtained by condensing water from coal distillation gas either by cooling or by washing with water is distilled and the vapors produced, e.g., water vapor, ammonia, hydrogen cyanide, hydrogen sulfide and carbon dioxide, are washed in a hot solution of alkali metal carbonate or hydroxide which contains finely divided iron as an iron salt, metallic iron, iron wastes, iron turnings, etc. The hydrogen cyanide is taken up from the vapors to a large degree, and a solution of alkali ferrocyanide is formed from which the solid salt may be produced simply. The process as thus practiced has the virtue of salvaging many values from coal gases but it has the disadvantage of yielding the ferrocyanide in a medium with other materials so that the recovery of a good pure grade, or a controllably pure grade, of ferrocyanide is extraordinarily difficult. That is, the ferrocyanide produced contains impurities quite similar to ferricyanides and compounds of that nature formed in conjunction with it. Hence, the crystallization processes for the separation are of limited effectiveness in delivering pure yield.

Furthermore, it is postulated that the process proceeds through the oxide stage with the oxygen being obtained either from the water or from the atmosphere. Thus, the ferrocyanide results from the slow oxidation of the iron to the oxide which, in turn is slowly and incompletely reacted with alkali metal cyanide solution to produce the ferrocyanide, The disadvantages of this procedure are quite evident.

An additional procedure for preparing alkali ferrocyanide may be found in U.S. Pat. No. 2,431,601 which reacts finely divided iron with an alkali metal cyanide solution. Compressed air is required in this process since it is blown through the reaction vessel in order to keep the iron suspended. The air sweep provides an oxidizing environment which, unfortunately, produces substantial amounts of iron oxide which must be removed before the ferrocyanide is isolated. The presence of the oxide does not allow for complete reaction with the alkali metal cyanide solution. Furthermore, it has been noted that as the reaction proceeds, the rate of dissolution of iron decreases.

It is accordingly a basic object of this invention to provide a process for preparing alkali metal ferrocyanides which takes advantage of the fact that pure hydrogen cyanide is available in liquid form in quantity and which converts this pure hydrogen cyanide into a very pure grade of ferrocyanide by carrying out the reaction in the medium so that only the ferrocyanide occurs with its precursor compounds.

It is a further object to provide such a process which overcomes the disadvantages inherent in the prior art processes.

Other objects and advantages of the invention will in part be obvious and in part appear hereinafter.

DETAILED DESCRIPTION OF THE INVENTION:

The invention, accordingly, is embodied in a process for synthesizing alkali metal ferrocyanide compound by the direct reaction of finely divided iron, alkali metal hydroxide, and hydrogen cyanide, in a sequence of steps wherein a reactor is charged with iron powder, water, and alkali metal hydroxide, following which there is added to the reactor at an elevated temperature, a charge of liquid hydrogen cyanide at a controlled rate. The specific reaction temperature may vary widely depending upon the HCN feed rate and the pressure at which the reaction is conducted. The instant process is not sensitive to pressure inasmuch as it deals solely with stable materials. Thus, typical reaction temperatures may range from about 95° C. to the boiling temperature of the system.

The process has the aspect of the unit charge and the continuous operation in that it commences with a large amount, to which is added hydrogen cyanide as the reaction progresses. After an initial charge, recycle liquor from a previous run consisting of dissolved alkali metal ferrocyanide and unreacted alkali metal hydroxide solution, is added, whereupon the controlled addition of hydrogen cyanide is again carried out. The product is isolated from the reaction after a cycle by decanting the caustic solution containing dissolved potassium ferrocyanide from the iron powder which settles rapidly to the bottom of the reaction vessel upon cessation of the agitation.

Once the solution is decanted from the reactor, the alkali metal ferrocyanide can be removed from the solution as hydrated crystals following evaporation of a certain amount of water.

Crystallization occurs rapidly and is aided by the fact that as water is removed, the concentration of the caustic in the solution decreases, rendering ferrocyanide less soluble in the medium. To insure complete removal of insoluble materials, such as carbon specks that come with the iron as a natural impurity, silica and other foreign materials, the mother liquor is filtered after decantation from the reactor but before the evaporation.

After the ferrocyanide crystals have been recovered by evaporation of the liquor obtained from the reactor, the volume of mother liquor is adjusted so that after the next incremental charge of iron and caustic is added and the liquor recycled, the contents of the reactor are brought back to the same relationships they had when the reaction was initiated.

The powdered iron which is left in the reactor subsequent to decantation should not be permitted to dry while the ferrocyanide is being recovered. Thus, for best operating results at least two reaction liquors should be used with one liquor undergoing reaction with the iron while the second is being evaporated for recovery of ferrocyanide crystals.

The process of this invention proceeds according to the following reaction mechanism wherein the stoichiometric amounts are indicated.

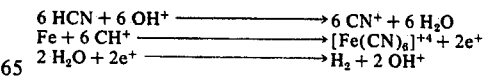

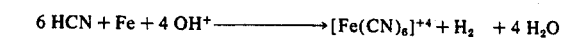

Further reference to the flow diagram constituting the figure of the drawing accompanying this application will also clarify the manipulations involved.

With regard to the specific components of the reaction procedure, any alkali metal hydroxide may be utilized, such as sodium and potassium hydroxide, this choice depending on the nature of the ferrocyanide product desired. The iron utilized should be finely divided, preferably 20 mesh or smaller. The iron produced by the hydrogen reduction of the oxide is preferable. As previously indicated, the reaction is generally conducted at a temperature between 95° C. and the boiling point of the system for a period ranging from about 2 to 10 hours.

The key process variables in conducting the novel process of this invention are the controlled rate of the hydrogen cyanide addition as well as the stoichiometric excess of both the alkali metal hydroxide and the iron as related to the hydrogen cyanide. Control of the rate of the hydrogen cyanide addition is essential in order to achieve the desired high yields of pure ferrocyanide product. Applicable feed rates may thus range up to about 0.6 mole HCN/mole Fe/hour, and preferably from about 0.03 to 0.15 mole HCN/mole Fe/hour, the importance of available iron to the process being reflected in the feed rate units. The feed rate may be varied during the course of the reaction, it having been determined that the rate of reaction reaches a plateau within about 30 minutes and then remains fairly constant until cessation of the cyanide addition. Accordingly, the hydrogen cyanide may be added slowly during the initial 30 minute reaction time and then added at an increased rate for the remainder of the reaction.

The stoichiometric excess of alkali metal hydroxide and iron relative to the hydrogen cyanide is essential in order to achieve satisfactory yields, complete reaction and reasonable reaction time. For purposes of the process of this invention, the alkali metal hydroxide should be present in up to about a 5 fold excess, and preferably a 2 to 5 fold excess, over the stoichiometric requirements, while the iron should be present in up to about a 20 fold excess, and preferably a 10 to 20 fold excess, over the stoichiometric requirements.

With regard to the iron component, it is believed that the rate of reaction is determined in large part by the available surface of the iron particles. With a new charge of iron, the particle size, while uniform, would be comparatively large. As the reaction proceeds, these particles become smaller and at the end of the reaction, since large excesses of iron are used over cyanide, many of the iron particles will be reduced greatly in size with a larger surface area per unit weight. With the introduction of fresh iron and with continuous recycle, a wide range in the size of iron particles will result.

Particle size will range from the original size of the fresh iron to extremely small iron particles on the verge of being in solution and certainly colloidal in size, which would have a tremendously large surface area-to-weight ratio.

When high concentrations of these small particles build up in the system, reaction takes place very rapidly and the primary feature of this invention is to create reaction conditions which generate as fast as they are used, small iron particles of large surface area so as to insure an extremely high reaction velocity. In this feature of increased reaction rate, the instant invention represents a significant improvement over the prior art processes.

This improvement is further indicated in that a reducing atmosphere is used for the reaction, i.e., no oxide is produced and no free oxygen is present in the system. Consequently, even if the reaction were to proceed through the oxide stage, a conversion to ferrocyanide would be instantaneous and 100 percent efficient. Under the conditions of the reaction, however, the cyanide ion is believed to directly attack the iron surface accompanied by a simultaneous reduction of water, and the reaction products are immediately removed from the medium by complex formation. In such case, the concentration of iron ions in solution and in equilibrium is essentially zero so that an equilibrium reaction which would normally come to a halt even with a low concentration of iron ions would go to completion.

In addition, since the reaction is conducted at the boiling point, or just below, substantial hydrolysis of potassium cyanide would be expected if at any given time there were appreciable amounts of free potassium cyanide in solution. However, hydrolysis of the cyanide is essentially zero in this system since the hydrogen cyanide is converted to potassium ferrocyanide immediately on addition to the hot caustic solution. Thus, in contrast to the prior art systems, the reaction medium is maintained as an alkali metal hydroxide solution rather than an alkali metal cyanide solution.

It should be noted that actual determinations in experimental operations involving industrial equipment have demonstrated the great ease with which the iron particles can be kept in suspension using standard agitators in the equipment turning at standard speeds. In addition, the rate of attack of the material on steel plate where the surface to mass ratio is quite low is sufficiently slow that ordinary steel reaction vessels may be used without detriment.

Thus, in recapitulation, the process of this invention involves carrying out the reaction directly, at high operating temperatures close to the boil, with controlled hydrogen cyanide addition, excess alkali metal hydroxide, and excess iron in suspension in the aqueous medium. The result is that very high yields of product are obtained which may be further optimized by alternate recycling of two reaction mother liquors being processed in the total operation at the same time.

Reference now to the flow diagram will clarify the steps involved in manipulation and, thereafter, reference to the specific examples giving experimental data on actual production operations conducted on an experimental scale will illustrate the manipulative variables. It is, of course, understood that the fundamental variables are the stoichiometric demands of the reaction and, thereafter, there are deviations from this which permit the industrial operating chemist to optimize his production by emphasizing one variable in the face of another.

The flow diagram shows a typical system for the process of this invention and the movement of the materials therethrough. The feed materials, i.e., iron, alkali metal hydroxide, and water are introduced into reactor 10 through line 11. The charge is heated and stirred, whereupon hydrogen cyanide is introduced via line 12 through mechanism 13 designed to control the addition rate. The various ingredients are, of course, balanced in the appropriate proportions.

Subsequent to the reaction, the iron settles in the reactor 10 while the caustic solution containing the dissolved alkali metal ferrocyanide is withdrawn, passed through filter 14 to evaporator 15 via line 16. It should also be noted that the hydrogen resulting from the reaction is vented and collected via line 17. With the appearance of crystals, the solution is cooled to crystallize the alkali metal ferrocyanide. The crystals are passed through filter 19 via line 18 and then dried and recovered. The filtrate is passed into recycle line 20 for blending with additional iron and alkali metal hydroxide and returned to reactor 10. The contents of the reactor should now be the same as when the reaction was initiated.

For improved performance and in order to insure the constant moist state of the iron powder, at least two reaction liquors should be used simultaneously. Thus, while one is undergoing reaction with the iron in reactor 10, the second is being evaporated for ferrocyanide crystal recovery in evaporator 15.

The following examples will further illustrate the embodiment of this invention. Where feed rates are indicated in cubic centimeters/minute, they may be readily converted into mole HCN/mole Fe/hour.

EXAMPLE I

This example illustrates a typical mode for conducting the novel process of this invention.

A closed reaction vessel fitted with means for mechanical agitation, a reflux condenser, and a pump syringe for introducing hydrogen cyanide, was charged with 460 grams of powdered iron having an average particle size of 100 mesh and smaller, 390 grams of 46 percent potassium hydroxide and 453 grams of water. These figures represented a 21 percent, by weight, potassium hydroxide concentration, a 20 fold excess of iron and a 2 fold excess of potassium hydroxide over the stoichiometric requirements.

The temperature of the system was maintained at 100° to 103° C. whereupon 64.8 grams of liquid hydrogen cyanide were added at a controlled rate, i.e., a rate of 0.14 cubic centimeters/minute for the first 30 minute addition period and then a rate varying from 0.19 to 0.74 cubic centimeters/minute for the remaining addition period. After several cycles a feed time of 2.1 hours in addition to the initial 30 minutes was attained, this being the equivalent of 0.11 mole HCN/mole Fe/hour. The solution was heated for an additional hour subsequent to the hydrogen cyanide feed period, whereupon the heating and agitation were discontinued in order to let the iron settle in the reactor. The supernatant solution was then decanted, passed through a heated filter in order to remove impurities, and boiled with continuous agitation until crystals appeared. Sufficient water was then added to give a clear solution. The solution was cooled and the resulting potassium ferrocyanide crystalline formation filtered and dried.

The filtrate was then admixed with 23 grams of fresh powdered iron and 205 grams of 46 percent potassium hydroxide and recycled to the reactor. The reaction was repeated for nine continuous cycles, each cycle incorporating the liquor and the iron from the previous cycle.

The results and material balance of the total reaction are presented in the following tabulation.

```
Materials Used in Runs
   Iron      Initial                                    460 g
             charge 9 increments of 23.0g               207
                                    Total:             667 g
                     metallic iron 0.97×667=647.0 g
   KOH       Initial 390 g at 46.0%=179 g at 100%
             charge 9 increments of 205g at
                                      46.0%=           848
                                      Total:           1027 g
   HCN       10 increments of 64.8 g=648 g
Materials Recovered
   Iron      445.8 g (at 97%=432 g)
   Liquor    473.1 g
             10.3% KOH or 48.7 g
             3.42% K4Fe(CN)6.3H2O or                   16.2 g
   Wash water 1133 g
             1.71% KOH or 19.4 g
             6.24% K4Fe(CN)6.3H2O                      or 70.7 g
   Waste solution 713.4 g
             0.80% KOH or 5.7 g
             5.49% K4Fe(CN)6.3H2O or                   39.2 g
   Product K4Fe                                        1460.4 g
   (CN)6 . 3H2O
```

Summary of Materials Balance
Materials Used
  Iron (100%)        647.0 g (11.6 moles)
  KOH (100%)         1027 g (18.3 moles)
  HCN                648 g (24.0 moles)
Materials Recovered
  Iron (100%)        432 g (7.74 moles)
  KOH in crystals    2.3 g
        in liquor    48.7 g
        in wash      19.4
        in waste     5.7
                     ———
                     76.1 g (1.36 mole)
  K4Fe(CN)6· 3H2O
        in crystals  1460.4
        in liquor    16.2
        in wash      70.7
        in waste     39.2
                     ———
                     1586.5 g (3.756 moles)

yield of K4Fe(CN)6 based upon HCN $$\frac{3.756}{24.0} \times 100 = 93.9\%$$

$$\frac{}{6}$$

Recovery of KOH
KOH in crystals, liquor or, wash & waste= 1.36 mole
equivalent KOH in K4Fe(CN)6 · 3H2O recovery = 3.756 × 4 = 15.02/16.38
                                              16.38/18.30 × 100 = 89.5%
Recovery of Iron
Iron remaining                     7.74 moles
equivalent iron in                 3.76
K4Fe(CN)6 · 3H2O
recovery           Total:          11.50 moles
                   11.50/11.60 = 99.1%

Individual Cycles

| cycle | Grams of dry product | Assay % as K4Fe(CN)6 ·3H2O | % as K4Fe(CN)6 | Grams of Product expressed as K4Fe(CN)6 ·3H2O | % KOH | g. KOH | % H2O |
|---|---|---|---|---|---|---|---|
| 1 | 108.4 | 97.2 | 84.8 | 105.4 | 0.10 | 0.11 | 10.8 |
| 2 | 145.8 | 100.1 | 87.3 | 145.9 | 0.11 | 0.11 | 11.1 |
| 3 | 142.3 | 100.6 | 87.7 | 143.2 | 0.12 | 0.17 | 10.6 |
| 4 | 156.8 | 98.7 | 86.1 | 154.8 | 0.74 | 1.16 | 10.6 |
| 5 | 112.9 | 101.2 | 88.3 | 114.3 | 0.07 | 0.08 | 9.6 |
| 6 | 193.6 | 102.2 | 89.1 | 197.9 | 0.00 | 0.00 | 9.5 |
| 7 | 120.0 | 101.2 | 88.3 | 121.4 | 0.06 | 0.07 | 9.1 |
| 8 | 171.6 | 100.0 | 87.2 | 171.6 | 0.05 | 0.09 | 10.3 |

| 9 | 140.2 | 105.5 | 92.0 | 147.9 | 0.13 | 0.18 | 6.6 |
| 10 | 149.3 | 105.8 | 92.3 | 158.0 | 0.19 | 0.28 | 6.6 |
| Total | | | | 1460.4 | | 2.30 | |

These results clearly indicate the efficiency of the novel process of this invention and the purity and excellent yield of the ferrocyanide product resulting therefrom.

EXAMPLE II

The general procedure described in Example I, hereinabove, was repeated with the exception that the system utilized was comparable to that depicted in the drawing. Thus, the reactor was constructed of heavy steel plate and equipped with a conventional agitator rotating at about 100 rpm. The reactor tank was equipped with steam coils, a vent to remove hydrogen and means for introducing the alkali metal hydroxide, iron, water and hydrogen cyanide at known and controllable rates.

The reaction was then conducted utilizing 1,000 times more of each reactant than indicated in Example I. The resulting ferrocyanide product was comparable to that produced in Example I, especially with regard to purity and yield.

EXAMPLE III

This example illustrates the effect on product yield and reaction efficiency caused by changes in critical process variables and the need for maintaining these variables within the general limits set forth hereinabove.

A. Hydrogen Cyanide Feed Rate

The reaction vessel described in Example I was charged with 55.8 grams of powdered iron, 100.7 grams of 45 percent potassium hydroxide, and 74 grams of water (resulting in 26 percent, by weight, potassium hydroxide). A reaction temperature of 103 – 112° C. was utilized. The feed rate of the added 16.2 grams of liquid hydrogen cyanide was varied and the corresponding product yield determined.

The results are presented in the following table:

| Run | HCN Feed Rate (cc/min.) | Feed Time (hrs.) | yield (%) |
| --- | --- | --- | --- |
| 1 | 0.0556 | 7 | 73.7* |
| 2 | 0.0779 | 5.5 | 93.4** |
| 3 | 0.109 | 3.5 | 95.0** |
| 4 | 0.0779 (first 30 minutes) | | |
| | 0.214 (remainder) | 2.1 | 100.0** |

*Fresh iron utilized.

** Iron from previous cycle plus 5 grams of fresh iron utilized.

B. KOH/HCN Mole Ratio

Run 4 of Part A, hereinabove, was repeated with the exception that only 75 grams of 45 percent potassium hydroxide (0.60 moles) was utilized. The yield of ferrocyanide product was reduced to 81.3 percent, thereby indicating the advisability of having a large excess (100 percent) of alkali metal hydroxide in the reaction system.

C. Iron /HCN Mole Ratio

Run 4 of Part A, hereinabove, was again repeated with the exception that the amount of iron was varied. The moles of iron and the corresponding product yields are presented in the following table:

| Moles of Fe | Excess Fe | Yield % |
| --- | --- | --- |
| 1.0 | 10× | 100 |
| 0.5 | 5× | 54.7 |
| 0.2 | 2× | 24.0 |

These figures dramatically indicate the desirability for maintaining at least about a 10 fold excess of iron in the system in order to achieve excellent product recovery.

Summarizing, it is thus seen that this invention provides a novel process for the preparation of alkali metal ferrocyanide. Variations may be made in proportions, procedures and materials without departing from the scope of the invention as defined by the following claims.

What is claimed is:

1. A process for the manufacture of alkali metal ferrocyanides which comprises the controlled addition, at a maximum rate of 0.6 mole HCN/mole Fe/hour and at temperatures ranging from 95° C. to the boiling temperature of the reaction mixture, of hydrogen cyanide to a reactor system containing an aqueous solution of alkali metal hydroxide in excess of about two to five times the stoichiometric requirements and carrying an actively agitated dispersion of finely divided iron particles in excess of about 10 to 20 times the stoichiometric requirements, maintaining said temperatures until substantial saturation of the aqueous medium with alkali metal ferrocyanide, permitting the iron particles to settle, removing the supernatant aqueous medium, inducing crystallization from it of hydrated alkali metal ferrocyanide, and recovering and isolating the ferrocyanide product from the reaction liquor.

2. The process of claim 1, wherein the reaction liquor resulting from said crystallization is admixed with additional iron and alkali metal hydroxide such that upon return of said mixture to said reactor, the contents thereof are at substantially the same level as they were at the initiation of the reaction.

3. The process in accordance with claim 1, wherein, following separation of the aqueous reaction liquor from the recovery of alkali metal ferrocyanide, a fresh charge is added to the reactor to form a second reactant charge and upon completion of reaction therein, a second supernatant solution is decanted and brought to an evaporator for recovery of alkali metal ferrocyanide simultaneously with the concentration and component adjustment of the reaction liquor resulting from the first recovery and its return to the reactor, said adjustment being such that the iron and alkali hydroxide contents thereof are at substantially the same level as they were at the initiation of the reaction.

4. The process in accordance with claim 2, wherein a plurality of reaction streams is taken from the reactor in sequence, alkali metal ferrocyanide recovered therefrom end the reaction liquor returned to the reactor as feed liquor, in sequence.

5. The process of claim 1, wherein said hydrogen cyanide is added to the reaction system at a rate of from about 0.03 to 0.15 mole HCN/mole Fe/hour.

* * * * *